United States Patent

Yoo

[11] Patent Number: 5,941,739
[45] Date of Patent: Aug. 24, 1999

[54] ELECTRICAL CONNECTION SYSTEM FOR A FULL ERASE HEAD ASSEMBLY OF A VIDEO CASSETTE RECORDER

[75] Inventor: Hyo-Jong Yoo, Seoul, Rep. of Korea

[73] Assignee: Daewoo Electronics Co., Ltd, Rep. of Korea

[21] Appl. No.: 08/935,061

[22] Filed: Sep. 22, 1997

[30] Foreign Application Priority Data

Sep. 30, 1996 [KR] Rep. of Korea ............. 96-43316

[51] Int. Cl.[6] .................................. H01R 13/33
[52] U.S. Cl. .................. 439/840; 439/78; 439/700
[58] Field of Search .................. 439/78, 79, 80, 439/81, 83, 700, 708, 743, 775, 816, 826, 840, 817

[56] References Cited

U.S. PATENT DOCUMENTS 5,382,169  1/1995  Bailey et al. ..................... 439/76
5,540,599  7/1996  Bishop ............................. 439/289

FOREIGN PATENT DOCUMENTS 0115214  8/1984  European Pat. Off. .

*Primary Examiner*—Lincoln Donovan
*Attorney, Agent, or Firm*—Pennie & Edmonds LLP

[57] ABSTRACT

An electrical connection system for electrically connecting a full erase head assembly to a power source in a video cassette recorder includes a main printed circuit board having a terminal connected to the power source, conductive connecting members for electrically connecting the full erase head assembly to the terminal, and a base for fixing the full erase head assembly to the deck, the base having at least a connecting hole for permitting the conductive connecting members to reach the terminal. The connecting members may comprise conductive and elastic springs.

7 Claims, 4 Drawing Sheets

US 5,941,739

ELECTRICAL CONNECTION SYSTEM FOR A FULL ERASE HEAD ASSEMBLY OF A VIDEO CASSETTE RECORDER

FIELD OF THE INVENTION

The present invention is directed to a video cassette recorder; and, more particularly, to an improved electrical connection system for connecting a main printed circuit board(PCB) to a full erase head assembly therein.

BACKGROUND OF THE INVENTION

A conventional home video cassette recorder incorporates therein a full erase head assembly for erasing recorded signals on a video cassette tape prior to recording on the tape.

FIG. 1 illustrates a schematic perspective view of a prior art electrical connection system for a full erase head assembly 20. An electric power is supplied to the full erase head assembly 20 from a power source via a main PCB 12 mounted under a deck 11. A base 30 mounted on the deck 11 is made of a synthetic resin and has a fixing hole 32 and a threaded hole 34. A pin 24 protrudes from a lower end of a head 22 facing the main PCB 12, and sets the assembling position of the full erase head assembly 20 with respect to the base 30 by being inserted into the fixing hole 32. A through-hole 26 is formed on a horizontally elongated part of the lower end of the head 22. A screw 28 is driven into the threaded hole 34 through the through-hole 26 to fix the full erase head assembly 20 to the deck 11. A male connector 40 having a terminal 42 is mounted on the upper part of the head 22.

Furthermore, electric wires 46 are provided on the main PCB 12 under the deck 11 in such a manner that lower ends thereof are fixed on the main PCB 12 via a main connector 48 and upper ends thereof are joined to a female connector 44 to be connected with the male connector 40.

In other words, the full erase head assembly 20 is mounted on the base 30 by first inserting the pin 24 into the fixing hole 32, followed by fixing the head 22 to the deck 11 through the screw 28. Then, the full erase head assembly 20 is electrically connected to the main PCB 12 by connecting the female connector 44 to the male connector 40.

However, the above described electrical connection system has a major shortcoming in that it is structurally complicated, posing a number of difficulties in electrically connecting the full erase head assembly to the main PCB.

SUMMARY OF THE INVENTION

It is, therefore, an object of the present invention to provide a structurally simple electrical connection system for a full erase head assembly of a video cassette recorder.

In accordance with the present invention, there is provided a video cassette recorder incorporating therein an electrical connection system for a full erase head assembly, the electrical connection system electrically connecting the full erase head assembly fixed on a deck to a power source, the electrical connection system comprising: a main printed circuit board having a terminal connected to the power source; a conductive connecting member for electrically connecting the full erase head assembly to the terminal; and a base for fixing the full erase head assembly to the deck, the base having at least a connecting hole for permitting the conductive connecting means to reach the terminal.

BRIEF DESCRIPTION OF THE DRAWINGS

The above and other objects and features of the instant invention will become apparent from the following description of preferred embodiments taken in conjunction with the accompanying drawings, in which.

DETAILED DESCRIPTION OF THE PREFERRED EMBODIMENT

Figure 1:
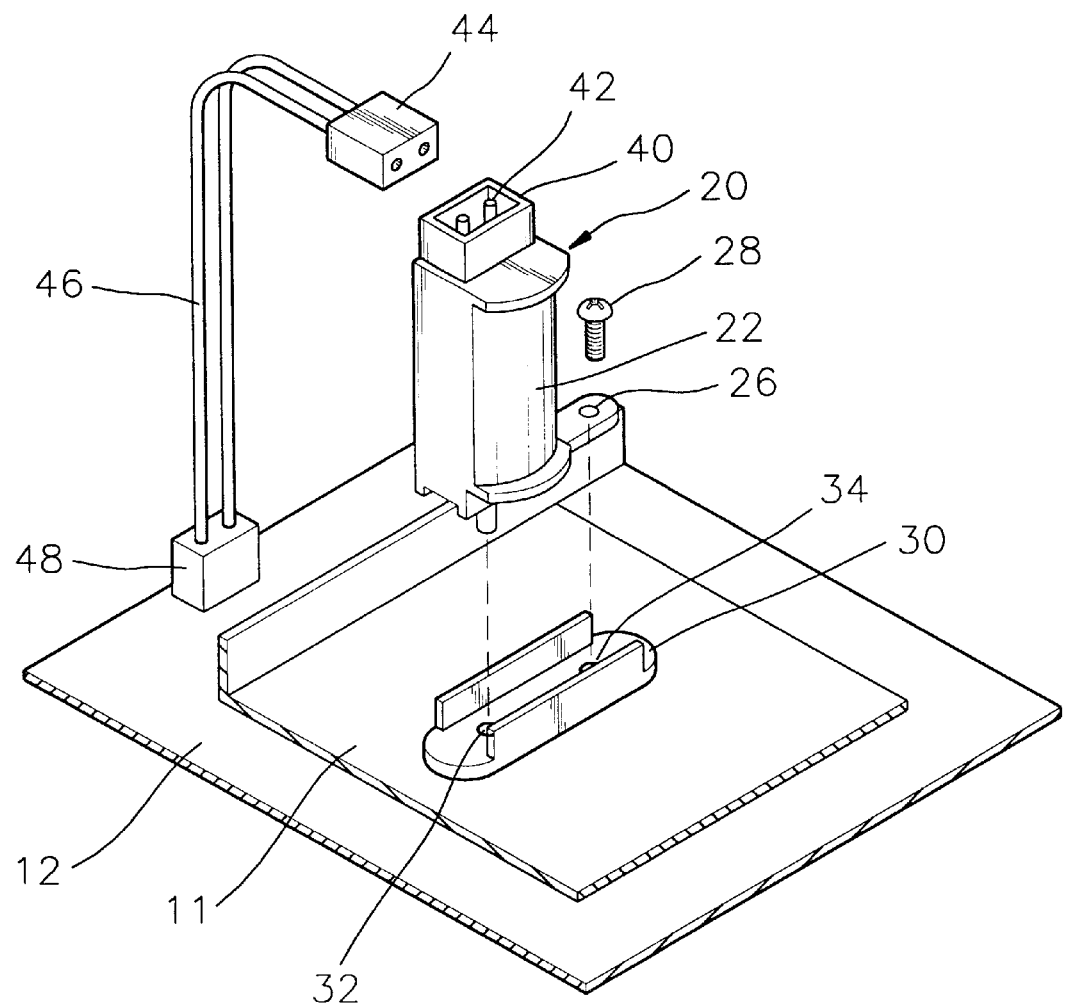
FIG. 1 illustrates a perspective view of a prior art electrical connection system for a full erase head assembly.
Figure 2:
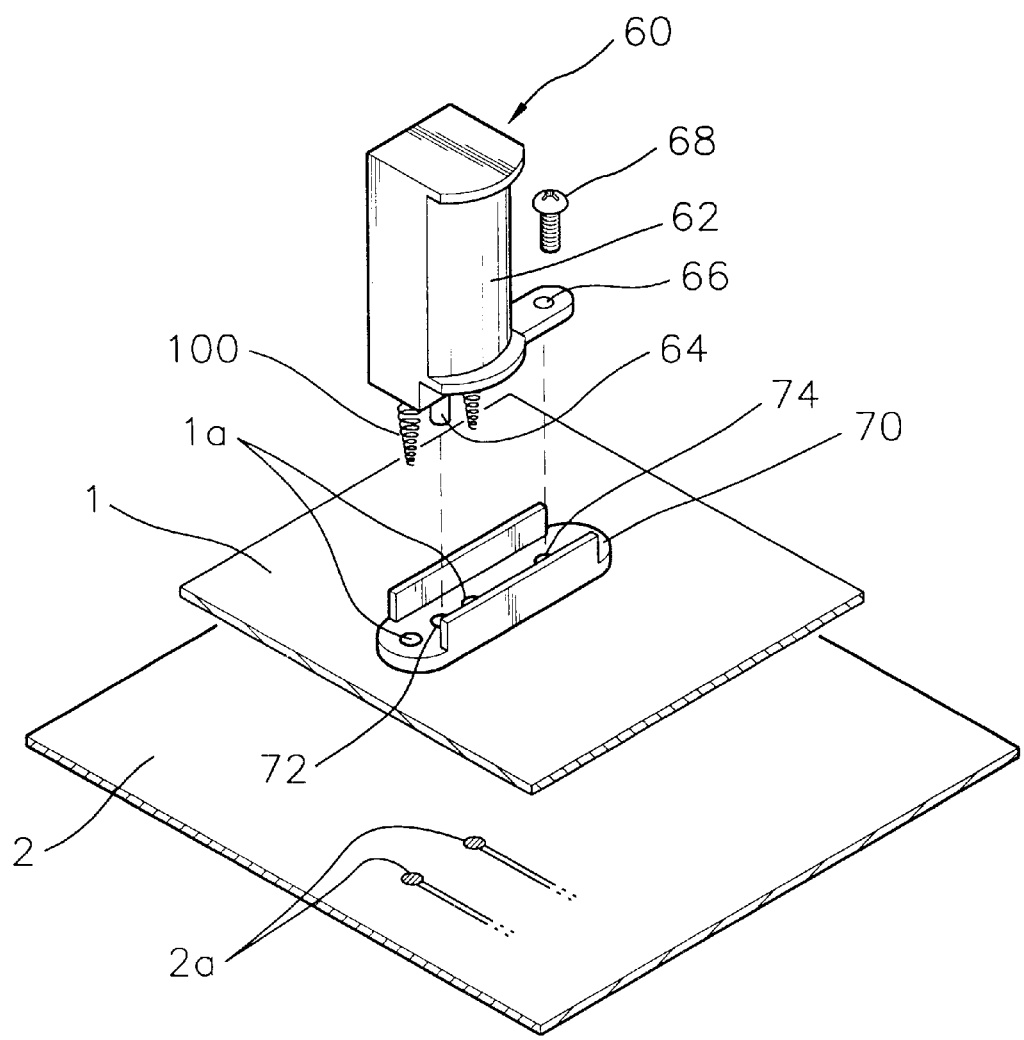
FIG. 2 shows a perspective view of an electrical connection system for a full erase head assembly in accordance with a first embodiment of the present invention.
Figure 3:
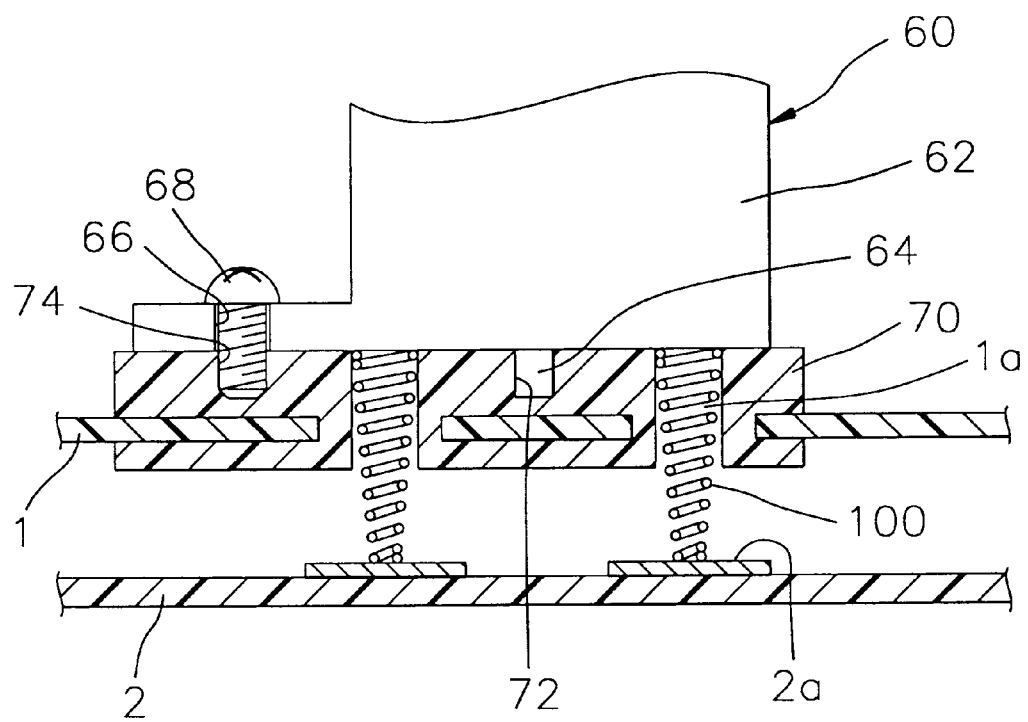
FIG. 3 describes a sectional view of the first embodiment in accordance with the present invention.

With reference to FIGS. 2 and 3, described below is an electrical connection system in a video cassette recorder, the electrical connection system being used for electrically connecting a full erase head assembly to a power source, in accordance with a first embodiment of the present invention.

A main PCB 2 is mounted under a deck 1. A base 70 made of a synthetic resin and having a fixing hole 72 and a threaded hole 74 is mounted on the deck 1. Further, the base 70 has a plurality of connecting holes 1a ,e.g., 2 as shown in FIGS. 2 and 3, adjacent to the fixing hole 72 and the threaded hole 74.

A pin 64 protrudes from a lower end of the head 62, facing the main PCB 2. The pin 64 sets assembling position of the full erase head assembly 60 with respect to the base 70 by being inserted into the fixing hole 72. A through-hole 66 is formed on a horizontally elongated part at the lower end of the head 62. A screw 68 is inserted into the threaded hole 74 through the through-hole 66 to fix the full erase head assembly 60 to the base 70. Further, a terminal 2a from a power source(not shown) is prepared on the main PCB 2 at a position corresponding to the connecting holes 1a.

Connecting members 100 protrude from the lower end of the head 62, facing the main PCB 2. The connecting members 100 electrically connect the full erase head assembly 60 to the terminal 2a on the main PCB 2 via the connecting holes 1a. The connecting members 100 are made of an elastic and conductive material. Preferably, the connecting members 100 are coiled compression springs, having reversed conoid shape as disclosed in FIG. 3. In this case, the conoid shape makes the engagement of the full erase head assembly 60 with the base 70 easy.

Figure 4:
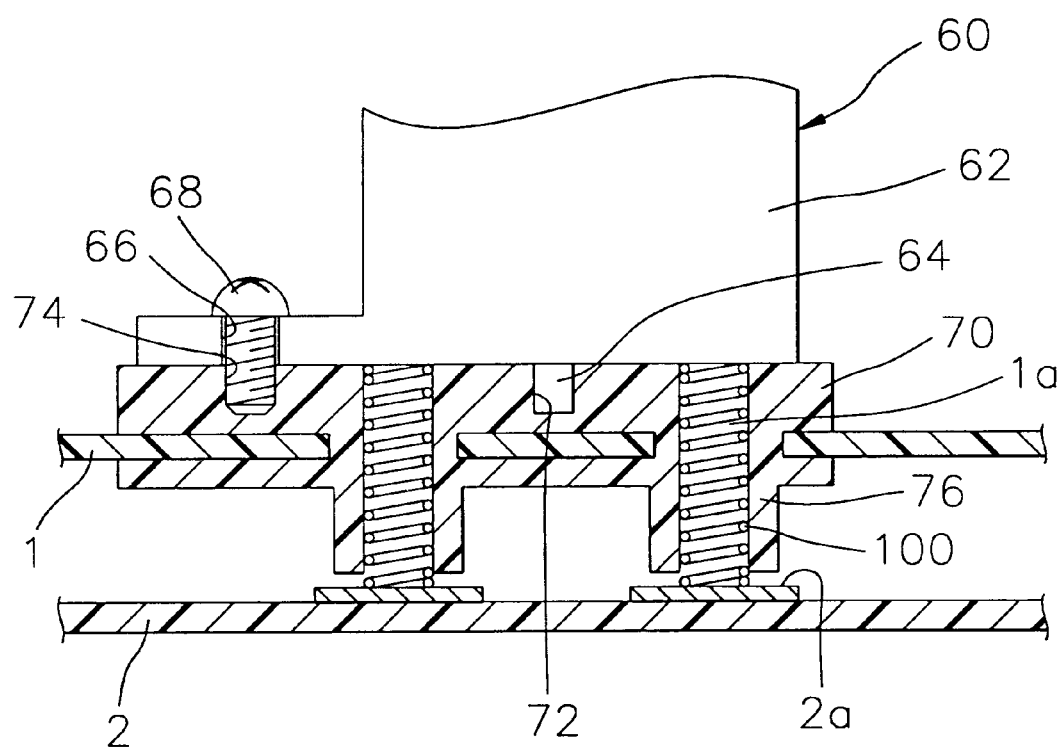
FIG. 4 depicts a sectional view of the electrical connection system for a full erase head assembly in accordance with a second embodiment of the present invention.

In a second embodiment of the present invention as disclosed in FIG. 4, each of the connecting holes 1a has a boss 76 integrally formed therewith. The boss 76 serves to minimize lateral movements of the connecting members 100. It is preferable that a cylindrical type coiled compression spring be used as the connecting member in such a configuration.

Although the invention has been shown and described with respect to the preferred embodiments, it will be understood by those skilled in the art that various changes and modifications may be made without departing from the scope of the invention as defined in the following claims.

What is claimed is:

1. An electrical connection system for a full erase head assembly within a video cassette recorder, said electrical connection system electrically connecting the full erase head assembly fixed on a deck to a power source and incorporating therein a main printed circuit board having at least one terminal connected to the power source, said electrical connection system comprises:

a coiled compression spring for electrically connecting the full erase head assembly to the respective terminal; and a base for fixing the full erase head assembly to the deck, the base having at least a connecting hole for permitting the conductive connecting means to reach the respective terminal.

2. The video cassette recorder of claim 1, wherein the coiled compression spring is of a reversed conoid shape.

3. The video cassette recorder of claim 1, wherein the coiled compression spring is of a cylindrical shape.

4. The video cassette recorder of claim 3, further comprising a boss for minimizing a lateral movement of the coiled compression spring is integrally formed at a lower end of the respective connecting hole.

5. An electrical connection system for a full erase head assembly within a video cassette recorder, said electrical connection system electrically connecting the full erase head assembly fixed on a deck to a power source and incorporating therein a main printed circuit board having at least one terminal connected to the power source, said electrical connection system comprises:

a coiled compression spring for electrically connecting the full erase head assembly to the respective terminal;

a base for fixing the full erase head assembly to the deck, the base having at least a connecting hole for permitting the conductive connecting means to reach the respective terminal; and a boss for minimizing a lateral movement of the coiled compression spring is integrally formed at a lower end of the respective connecting hole.

6. The video cassette recorder of claim 5, wherein the coiled compression spring is of a reversed conoid shape.

7. The video cassette recorder of claim 5, wherein the coiled compression spring is of a cylindrical shape.

* * * * *